United States Patent
Canfield (10) Patent No.: US 6,252,906 B1
(45) Date of Patent: Jun. 26, 2001

(54) DECIMATION OF A HIGH DEFINITION VIDEO SIGNAL

(75) Inventor: Barth Alan Canfield, Indianapolis, IN (US)

(73) Assignee: Thomson Licensing S.A., Boulogne Cedex (FR)

(*) Notice: Subject to any disclaimer, the term of this patent is extended or adjusted under 35 U.S.C. 154(b) by 0 days.

(21) Appl. No.: 09/126,973

(22) Filed: Jul. 31, 1998

(51) Int. Cl.[7] ....................................................... H04N 7/12
(52) U.S. Cl. ............................................................ 375/240.21
(58) Field of Search ........................ 375/240.21, 240.24, 375/240.25, 240.26, 240.29; 348/564, 565, 568, 399, 408, 845.2; 382/235

(56) References Cited

U.S. PATENT DOCUMENTS

| | | | |
|---|---|---|---|
| 4,982,288 | | 1/1991 | Isobe et al. ........................... 358/183 |
| 5,111,297 | * | 5/1992 | Tsuji et al. ........................... 348/565 |
| 5,138,307 | | 8/1992 | Tatsumi ................................. 340/721 |
| 5,208,660 | | 5/1993 | Yoshida ................................. 358/22 |
| 5,361,098 | * | 11/1994 | Lucas .................................... 348/565 |
| 5,386,241 | * | 1/1995 | Park ..................................... 348/565 |
| 5,450,133 | * | 9/1995 | Herpel et al. ........................ 348/452 |
| 5,555,097 | * | 9/1996 | Joung et al. .......................... 386/123 |
| 5,657,093 | | 8/1997 | Park ..................................... 348/568 |
| 5,691,768 | * | 11/1997 | Civanlar et al. ...................... 348/392 |
| 5,708,457 | | 1/1998 | Otake et al. .......................... 345/114 |
| 5,969,768 | * | 10/1999 | Boyce et al. ......................... 348/565 |
| 5,982,433 | * | 11/1999 | Kim ..................................... 348/396 |
| 5,995,160 | * | 11/1999 | Rumreich ............................. 348/564 |
| 6,005,621 | * | 12/1999 | Linzer et al. ......................... 348/398 |
| 6,025,878 | * | 2/2000 | Boyce et al. ......................... 348/402 |
| 6,046,777 | * | 4/2000 | Patton et al. ......................... 348/565 |
| 6,061,098 | * | 5/2000 | Nie et al. ............................. 348/582 |

FOREIGN PATENT DOCUMENTS

| | | | |
|---|---|---|---|
| 0366919 B1 | 5/1990 | (EP) | ................................. H04N/7/13 |
| 0473390 A2 | 3/1992 | (EP) | ................................. H04N/5/272 |
| 97/24869 | * 7/1997 | (WO) | ............................... H04N/5/45 |
| 98/27725 | * 6/1998 | (WO) | ............................... H04N/5/45 |

OTHER PUBLICATIONS

Shen et al, "Adaptive Motion Vector Resampling for Compressed Video Down–Scaling", IEEE, 1997.*

Perkins et al, "A Low Cost, Monolithic, Color Picture–in–Picture Device", IEEE Trans. on Consumer Electronics, vol. 40, No. 3, Aug. 1994.*

Rick et al, "Digital Color Decoder for PIP–Applications", IEEE Trans. on Consumer Electronics, vol. 42, No. 3, Aug. 1996.*

* cited by examiner

*Primary Examiner*—Vu Le
(74) *Attorney, Agent, or Firm*—J.S. Tripoli; E.P. Herrmann (57) ABSTRACT

A video processor receives coded digital image data which is decoded into MPEG compatible pixel blocks. The pixel blocks are horizontally and vertically decimated to produce a reduced size image suitable for picture-in-picture, picture-on-picture, or picture-in-graphics display. Decoded input data to the decimation network is alias filtered and decimated at a factor of 8 to 3. Decimated output pixel data is derived solely from a respectively associated decoded input pixel block.

18 Claims, 7 Drawing Sheets

DECIMATION OF A HIGH DEFINITION VIDEO SIGNAL

FIELD OF THE INVENTION

This invention relates to digital video signal subsampling or decimation.

BACKGROUND OF THE INVENTION

High definition television (HDTV) signals typically are not compatible with current broadcast standards such as NTSC. A preferred signal coding standard suitable for use with the HDTV compatible signals is MPEG-2 (Motion Picture Experts Group, "Information Technology—Coding of Moving Pictures and Associated Audio Information: Video," ISO/IEC 13818-2, May 15, 1996) as adopted by the Grand Alliance for use in the United States. This well-known standard provides formatting guidelines for coding and compressing video, audio and auxiliary data.

Formatting television signals with the MPEG-2 standard required both television broadcast transmission and receiving system architectures to be redesigned. Designers introduced compression systems which reduce the amount of broadcast data. HDTV receivers decode and decompress the received coded HDTV data and reconstruct a full resolution signal for display. Losses in the signal are minimal because of the sophistication of the coding/decoding and reconstruction techniques employed, and expected losses typically occur where the human eye is perceptually limited, for example, in fine detail of diagonal motion.

Whereas much research and development has occurred in all aspects of transmission and reception of HDTV, designers are focusing on HDTV receivers because of competition to produce a consumer product with the best features at the lowest cost. The first consumer HDTV receivers may include fewer features than current standard definition television receivers, but will offer new features such as a 16:9 display. Manufacturers are now designing consumer receivers which not only include features available today in standard definition receivers, such as PIP, but also features which support other applications, such as interactive television and Internet access. Manufacturers are challenged to design system architectures which incorporate into the HDTV receiver new services and features not currently available in a TV receiver, or which are only available via a set top box or some other interface.

HDTV receivers will be able to display graphics, for example a spread sheet program, as well as traditional programming. Displaying graphics may also occur if the viewer is using the HDTV receiver to access information on the Internet, for example. The viewer may wish to monitor traditional high definition (HD) programming or another HD video signal at the same time the graphics are being displayed. This is known as picture-in-graphics, or PIG. Or the viewer may wish to view two programs, at least one of which is HD, using the picture-in-picture (PIP) or picture-on-picture (POP) feature. An HDTV signal which is transmitted according to the MPEG2 standard presents a different set of design problems to overcome because the video data is formatted into blocks and macroblocks instead of lines.

Presenting a second, smaller image in a larger image by PIP, POP or PIG requires the smaller image to be filtered and subsampled to attain the desired size for display. This is easily done in the horizontal direction. Vertical decimation of a video signal, however, has always been a challenge to designers when dealing with an interlaced video signal. Vertical decimation of an interlaced signal produces noticeable artifacts because the phase of the new lines must be calculated. To get the correct phase, either the preceding or following field must be available, requiring storage of the needed field in memory. This increases memory and bandwidth requirements. To reduce aliasing, the signal must be band limit filtered, but without all of the lines available to the filter, the resulting spectrum is incorrect.

These traditional problems are compounded by the complexity of pixel blocks and macroblocks of the MPEG2 format. Traditional line memories are not sufficient to accommodate an input data stream which is not in line by line order. Known HDTV receivers reformat the data to raster scan format before converting the full resolution signal to the PIP, POP or PIG signal to be displayed.

SUMMARY OF THE INVENTION

In accordance with the principles of the present invention, a reduced resolution image for display is provided by decimating pixel block data, such that decimated pixel data is derived solely from its respective undecimated pixel block.

DETAILED DESCRIPTION OF THE PREFERRED EMBODIMENTS

Figure 1:
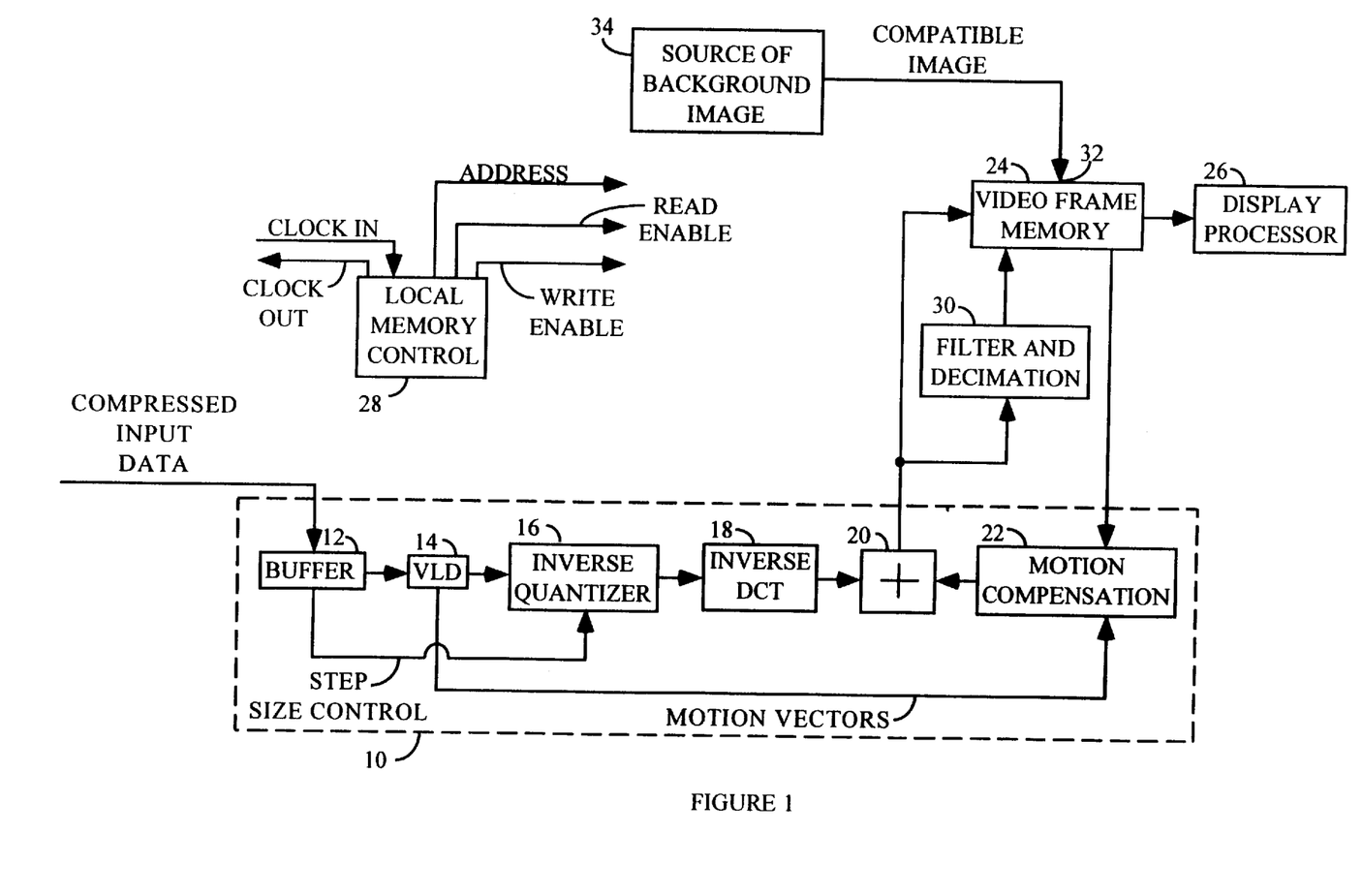
FIG. 1 is a block diagram of an HDTV receiver including the present invention.

FIG. 1 illustrates a portion of an HDTV receiver including an MPEG2 compatible decoder 10 and element 30 according to the principles of the present invention. The received HDTV signal was compressed prior to broadcast in a manner which is substantially inverse to the decompression and decoding performed by decoder 10. The illustrated configuration of decoder 10 is well known.

Compressed data is received from a tuner and demodulator (not shown) and input to a buffer 12. Buffer 12 monitors the data rate of the compressed input data stream and supplies a variable length decoder (VLD) 14. VLD 14 decodes the variable length encoded data stream. VLD 14 passes the decoded data stream to an inverse quantizer 16, which returns the decoded data stream to dequantized coefficients representing video data. Inverse quantizer 16 passes the dequantized coefficients to inverse discrete cosine transformer (IDCT) 18, which inverse transforms the dequantized coefficients into pixel data.

The pixel data are formatted as blocks and macroblocks compatible with the MPEG2 standard. Also according to the MPEG2 standard, the pixel blocks define I, P or B frames or fields. The I and P frames or fields, and optionally the B frame or field, are stored in frame memory 24 via combiner 20 for use during reconstruction of complete frames or fields. Writing data into and reading data out of memory 24 occurs under the control of local memory controller 28.

When pixel data exits IDCT 18, related pixel data required for image reconstruction are retrieved from memory 24 and sent to motion compensator 22. Motion compensator 22 calculates the information required to reconstruct the current pixel of a field or frame and sends the data to combiner 20. Combiner 20 combines pixel data from IDCT 18 and motion compensator 22 and stores the reconstructed result in memory 24. This newly reconstructed data is stored until needed to reconstruct subsequent fields and frames from newly decoded pixel data comprising P or B fields and frames. The reconstructed data is also sent to display processor 26 for processing prior to display, or output to a storage device, etc. (not shown.)

When a viewer chooses to view a program by PIP, POP or PIG, reconstructed image fields or frames are sent from combiner 20 to filter and decimator 30 under the control of a microcontroller according to the principles of the present invention. Element 30 filters the data in both the vertical and horizontal directions for aliasing purposes, and decimates the pixel data to the desired number of pixels to produce a reduced resolution image for display. The decimated image is stored in memory 24 until needed by display processor 26. Decimation, in this context, includes the reduction of pixels by any manner, such subsampling, weighted combination of pixels, and the like.

At the same time that filter and decimator 30 is providing the decimated first image to memory 24, a background second image is also provided to memory 24 for display via input 32. The background image comprises the graphics or program displayed prior to selecting the PIP, POP, or PIG option. The decimated image provided by element 30 is a foreground image which is switched or mapped into the background image by known methods. For example, known integrated circuits includes provisions for accessing both images from memory and displaying the decimated image in a window within the background image.

If the second image is a graphics image, provided by a computer for example, the image has been formatted to the requirements of display processor 26 prior to being stored in memory 24. The formatting may or may not occur in the television receiver. If the second image is a broadcasted television program, a second tuner provides the decoded image to display processor 26. Such a system for providing PIP, POP and PIG displays is found in television receivers and video tape recorders as is known. The second tuner provides the second image to memory 24 formatted to the requirements of display processor 26. An alternative to storing the second image in memory 24 is for the device supplying the second image to have its own memory which is coupled to and accessible by display processor 26, or processing the image in real time and providing the image directly to display processor 26.

Figure 2:
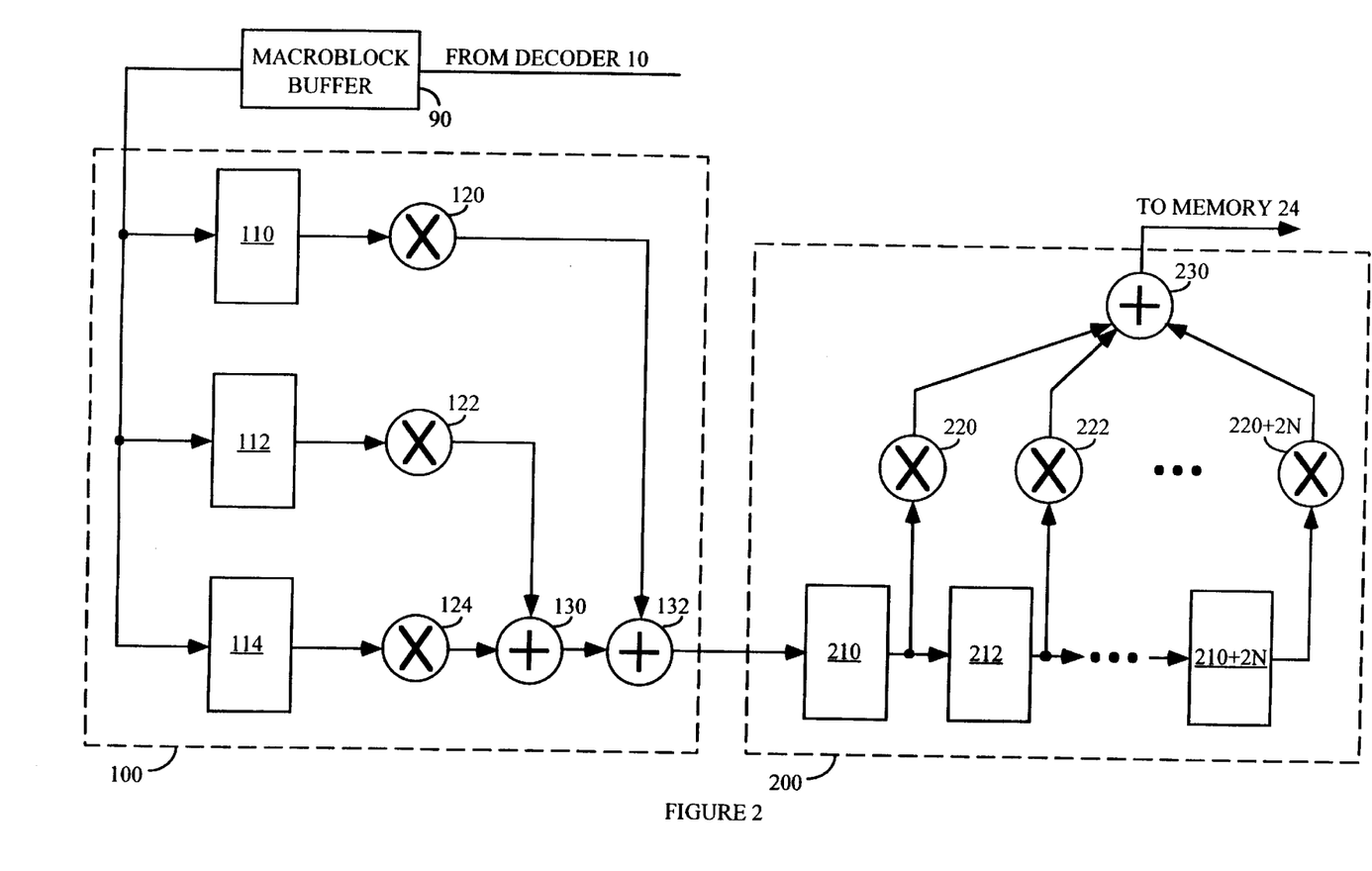
FIG. 2 is a block diagram of element 30 of FIG. 1.

FIG. 2 illustrates one possible configuration of filters and decimators comprising element 30 according to the principles of the present invention. Macroblock buffer 90 receives a decompressed and decoded macroblock of pixels from decoder 10 and holds the data until needed by vertical filter decimator 100. Vertical filter/decimator 100 performs aliasing filtering and decimation in the vertical direction. Horizontal filter/decimator 200 performs aliasing filtering and decimation in the horizontal direction.

Element 100 includes an aliasing polyphase low pass filter comprised of filter elements 110, 112 and 114. Other filter types can also be employed here, such as a finite impulse response (FIR) filter, for example. MPEG2 compatible systems resemble a raster scan system because the bitstream represents consecutive raster scan rows of contiguous image representative macroblocks. In a raster scan system, vertical FIR filters are expensive to implement because a large amount of memory is required for each tap. The memory required for each tap of an MPEG2 compatible system would be the amount of data in each line times the number of lines in a macroblock.

The output of elements 110 to 114 provide data to multipliers 120, 122 and 124, respectively, which each apply a desired weighting coefficient to their respective input signal. The weighted outputs of multipliers 122 and 124 are summed in adder 130, and the outputs of adder 130 and multiplier 120 are summed in adder 132. Alternatively, a three input adder could be substituted to receive the outputs of multipliers 120 to 124. The output of adder 132 provides data to horizontal filter/decimator 200.

Element 200 includes an aliasing filter comprised of individual FIR filters 210, 212, to 210+2 n, where n+1 equals the number of filters used to achieve the desired horizontal decimation. The output of each FIR filter is provided to multipliers 220, 222, to 220+2 n, respectively, each of which applies a desired weighting coefficient to the input signal. The weighted outputs of the multipliers are summed in adder 230 and sent to memory 24 for storage until needed by display processor 26. The structure of horizontal filter/decimator 200 is that of a sample rate converter employing FIR filters and is well known in the art of video processing.

FIG. 2 operates on data from a single block, e.g., a macroblock or subblock thereof, at any given time. Even in a boundary situation, each decimated pixel value is derived solely from the input block of pixel data. No blending of pixel values from preceding or adjacent blocks occurs.

For example, filter decimator 30 of FIG. 1 may comprise the structure of FIG. 2. For this structure, three or fewer pixels enter the polyphase filter internal to element 100 from buffer 90 and are weighted appropriately. When fewer than three pixels enter the filter, the weighting coefficient applied to multipliers without valid data are set to zero so as not to create error. Alternately, the structure of FIG. 2 may be repeated in parallel to accept an entire vertical row of pixels from a macroblock simultaneously. Repeating the structure of FIG. 2 increases processing speed, but also increases costs and chip size.

The structure of vertical filter/decimator 100 advantageously exhibits PIP, POP or PIG capabilities. Each output line of element 100 is a function of at most three input lines, and is a function of lines from a single macroblock or subblock of that macroblock. If less than three lines are input to the structure of unit 100, a weighing coefficient of zero is applied to the multiplier receiving invalid data. This structure provides several advantages which simplify its design. First, by limiting the data input to element 30 (FIG. 1) to be from the same macroblock or subblock, the vertical filter's (elements 110 to 114) need for multiple line memories or other memory structures necessary to access an entire line is eliminated. Memory requirements are thereby reduced to a buffer capable of storing one block or macroblock. This memory may reside in or be located prior to vertical filter/decimator 100 (not shown), or it may be included in frame memory 24. Previous filter/decimator structures require an entire line memory for the vertical filter/decimator. For a high definition signal comprising 1920 by 1080 pixels per image presented as macroblocks, a single line includes portions from 120 macroblocks. Known line decimators in a macroblock environment would require all 120 macroblocks to be decoded and stored before vertical filtering and decimation a video signal.

Second, the vertical decimation ratio of 8:3 (=2.67:1) obtains substantially equivalent results as the 3:1 reduction now used for PIP, POP or PIG images. The known vertical decimation ratio of 3:1 was chosen because 2:1 provided too little decimation for PIP, POP or PIG applications, and 4:1 provided too much decimation for PIP, POP or PIG applications. For raster line formatted video signals, 3:1 decimation provided the desired vertical image size and required three line memories. The perceptual difference to viewers between 8:3 and 3:1 is negligible.

Third, element 100 generates six luminance line segments from each luminance macroblock in this example. Because the data is processed in macroblock form, element 100 will accept both field and frame formatted video signals.

For chrominance data, the same or similar structure of filter/decimator 30 may be used. Chrominance data is already reduced in vertical resolution by fifty percent. Therefore, the chrominance pixel block is further vertically decimated by a ratio of 4:3 in element 30. To accomplish the vertical decimation, two of four pixels in a block bypass element 100 or pass unchanged through element 100 to element 200 for horizontal filtering and decimation. The other two pixels are filtered, weighted, and added together by the structure of element 100 before passing to element 200. The two pixels are processed in substantially the same manner as the luminance pixels described above.

Figure 3:
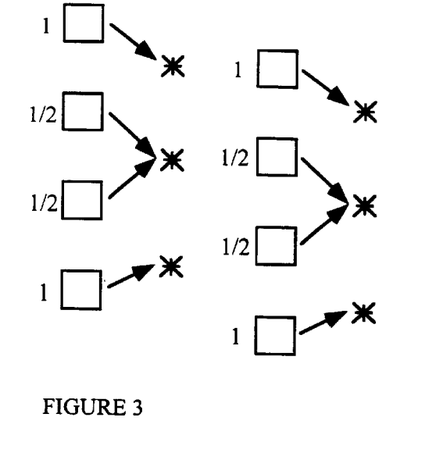
FIGS. 3 to 6 illustrate examples of vertical decimation for field and frame based images.

FIG. 3 illustrates vertical decimation of pixels in a field. Luminance pixels are represented as circles before vertical decimation, and chrominance pixels are represented by squares before decimation. Decimated luminance and chrominance pixels are represented by asterisks. FIG. 3 only illustrates three pixels in each of the eight-pixel line segments included in each luminance macroblock field, and three pixels in each of the four-pixel line segments included in each chrominance macroblock field.

In FIG. 3, the source is a 1H interlaced video signal containing 30 frames per second, for example. The decimated output signal is a 1H interlaced video signal occurring at the same rate. The first two vertical pixels of the first field are processed into one pixel. The next three vertical pixels are also processed into one pixel, and the last three vertical pixels of the pixel block of the first field are processed into one pixel. For the alternate field, the groupings of vertical pixels to be vertically filtered and decimated are different. Two groups of three vertical pixels are each processed into one pixel, and the last two vertical pixels of the block of the respective alternate field are processed into one pixel.

For groupings of vertical pixels being decimated into one pixel, the summed weighting coefficients applied to the multipliers equal unity (1). For example, the exemplary embodiment multiplies the first and third pixels of a three pixel group by 0.25 and the middle pixel of the group by 0.50. For groups of two pixels, each pixel is multiplied by 0.50. Other weighting functions are available for each group that when summed together equal unity. It may also be desired that the summed weighting functions do not equal unity, but that the total of all coefficients of the block or macroblock equal some predetermined value.

For chrominance pixel blocks, the alternate fields are vertically decimated in substantially the same manner. As is seen in FIG. 3, the value of the first and last vertical pixels are maintained, whereas the middle two pixels are processed into one pixel. For the exemplary embodiment, weighting coefficients applied to the two middle pixels by the multiplier elements equal 0.50. Alternate weighting coefficients may be applied for the chrominance pixels as desired or as required to accommodate the correct balance between luminance and chrominance vertical filtering and decimation.

Filter coefficients for field based data are carefully chosen to give the proper phase to the new lines since filter coefficients determine the effective placement of the filtered lines relative to the input lines. Constraining the input lines for a given output line to lie within the same macroblock does not add difficulty to determining the coefficients, but it does limit the quality of the filter to the filter order. Filter order is a function of the number of input lines used to construct an output line. However, constraining the structure of FIG. 2 to a single 16-line macroblock does not noticeably affect PIP, POP or PIG images because the reduction is 8:3.

Figure 4:
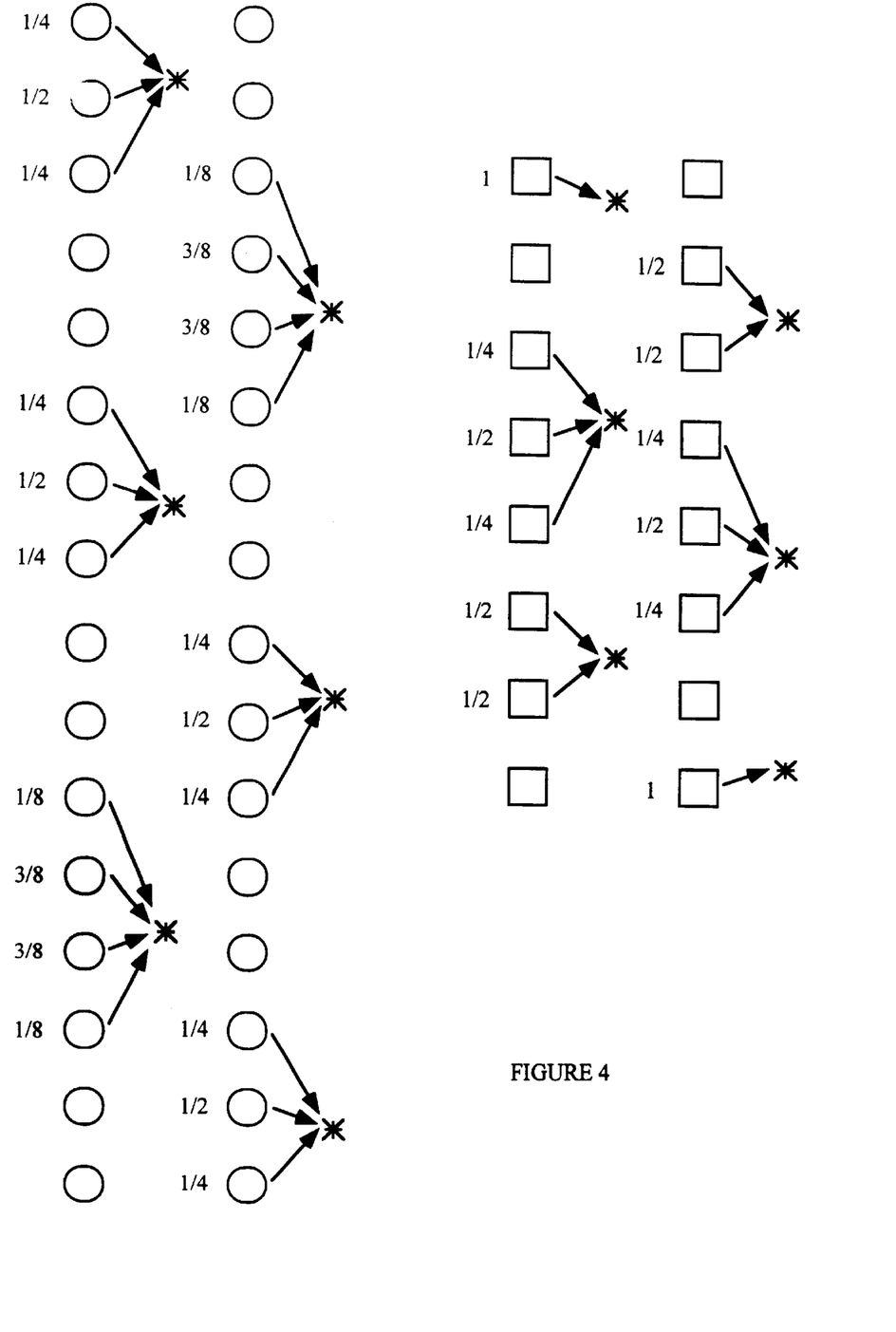

FIG. 4 illustrates vertical decimation of pixels in a frame. In this example the video signal source is progressive scan occurring at a rate of either 24, 30 or 60 frames per second. The decimated output signal is a 1H interlaced signal occurring at the same rate. As in FIG. 3, circles represent luminance pixels, squares represent chrominance pixels and asterisks represent decimated pixels. Data is read from memory at a rate of 60 Hz. Data occurring at 24 or 30 frames per second is read twice for each vertical line, and data occurring at 60 frames per second is read once for each vertical line. Data occurring at 24 frames per second is converted to the display rate in the display processor. FIG. 4 illustrates the frame being read at 60 Hz and generating 3 pixels from 16 input vertical pixels during each read. The result is the macroblock generates 6 pixels for each 16 input pixels, which is equal to an 8:3 decimation rate at 30 frames per second. At a frame rate of 24 and 30 frames per second, no data skipping occurs because the same data is read twice. At a frame rate of 60 frames per second, some data is skipped but the effects are not noticeable to the viewer, and the result is an image occurring at the display rate of 30 frames per second. This eliminates further decimation in the display processor. As in FIG. 3, the weighting coefficients applied to each input pixel contributing to an output pixel are shown as a fraction beside the input pixel. Weighting coefficients will be discussed below.

Figure 5:
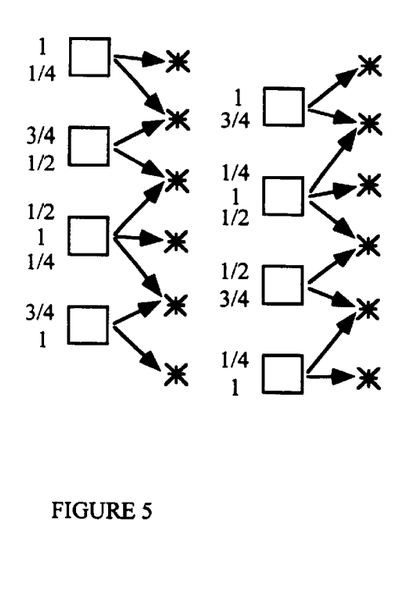
Figure 6:
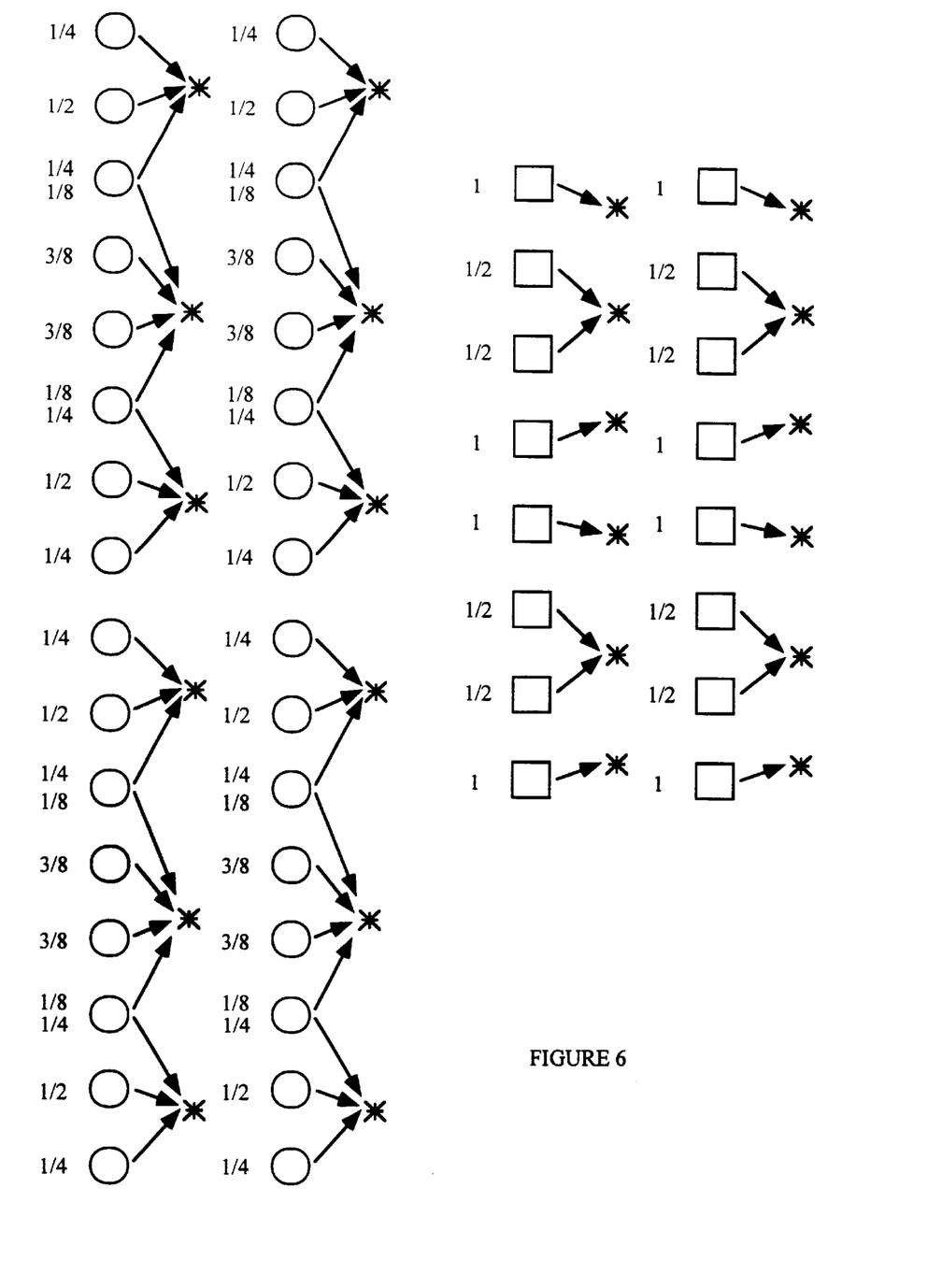

FIGS. 5 and 6 illustrate the decimated output in a 2H progressive format. FIGS. 5 and 6 have as inputs the same source video signals as shown in FIGS. 3 and 4, respectively. For this case, the decimation rate is 8 to 6 for luminance data because of the progressive format output requirement. For chrominance data, a block of four-by-four pixels must actually be upsampled to six pixels for each of four vertical input pixels. The circuit structure of FIGS. 2 and 7 may included additional multipliers and adders to support the increased resolution of these examples.

Figure 7:
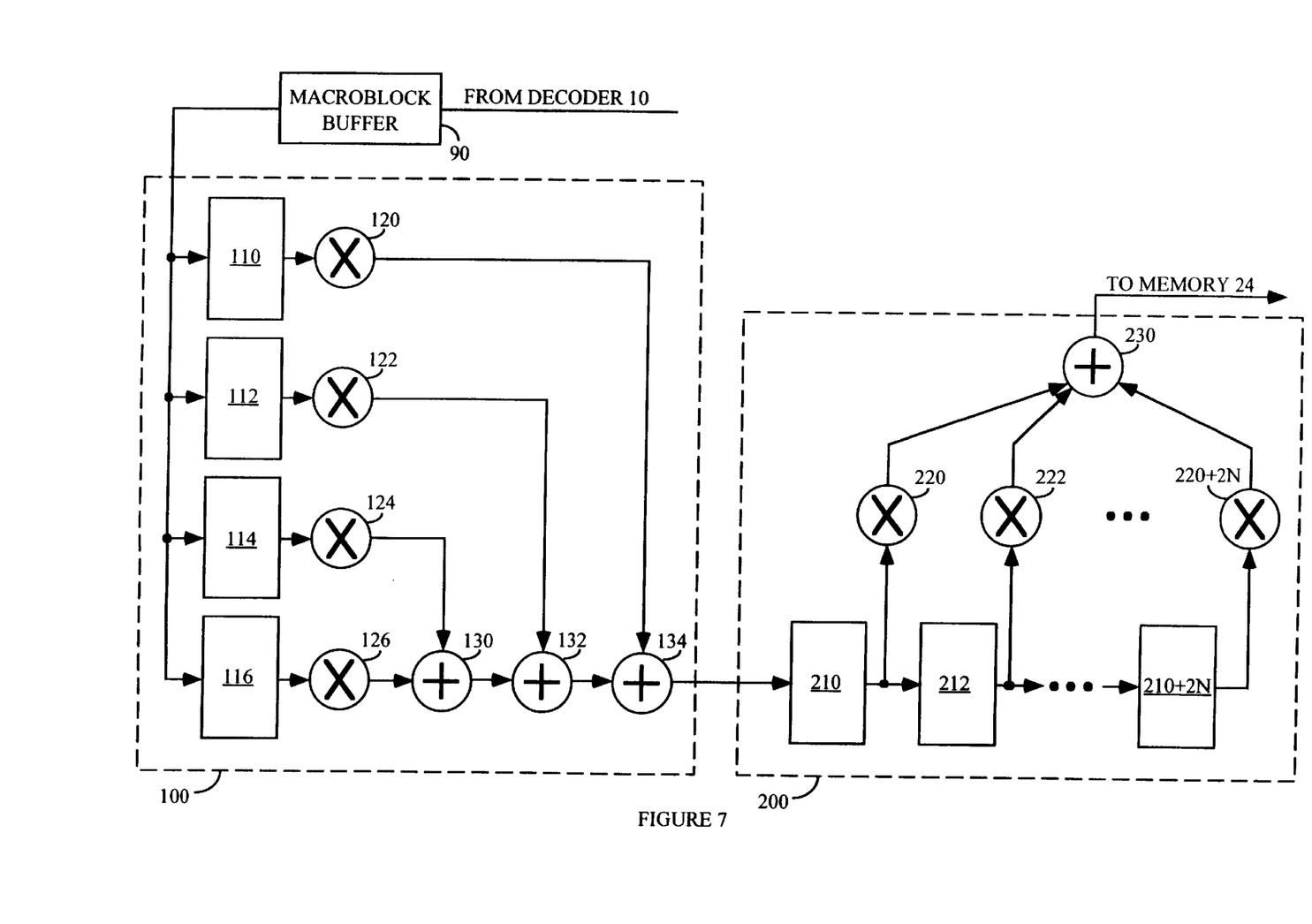
FIG. 7 is another exemplary block diagram of element 30 of FIG. 1.

The same basic circuit structure may be utilized for both field and frame based image block data. For this example, up to four input pixels are processed into one output pixel. The filter/decimation structure is shown in FIG. 7. Exemplary weighting coefficients for the groups of pixels are given in FIGS. 3 to 6. The weighting coefficients are the numbers beside the input pixel. If input pixel values are used to determine more than one output pixel, the weighting coefficient on top corresponds to the output pixel indicated by the arrow pointing generally up, and the weighting coefficient on the bottom corresponds to the output pixel indicated by the arrow pointing generally down.

The chrominance frame based macroblock filtering/decimation structure also reads data at the rate of 60 Hz. The exemplary input/output from filter/decimator 30 is shown in FIGS. 4 and 6. Exemplary weighting coefficients for the pixel groups are indicated as described above. Both frame based luminance and chrominance coefficients are exemplary and may be changed to achieve a desired phase or other effects.

For the above embodiments, filter/decimator 30 is located ahead of frame memory 24 as shown in FIG. 1. Traditionally, filtering and decimation occur before memory because memory capacity requirements and memory bandwidth are reduced. However, it is possible to place element 30 after memory 24. For an MPEG compatible system, placing element 30 ahead of memory reduces memory bandwidth, but, because I and P frames must be stored for reconstruction, memory capacity is only minimally reduced. Memory bandwidth is reduced because only the decimated PIP, POP or PIG image is read from memory during the critical display interval. Placing element 30 after memory 24 requires the full resolution image to be read during the display interval.

Vertical and horizontal filtering/decimation are mutually independent processes and may be separated, for example, one before and one after memory 24, arbitrarily. Known systems typically have horizontal filtering/decimation before vertical filtering/decimation. For the reasons stated above, vertical filtering/decimation will generally reside before memory 30. Horizontal filtering/decimation capabilities may exist in display processor 26 in the form of a sample rate converter. Whereas vertical filtering/decimation most efficiently occurs prior to frame memory storage, a vertical sample rate converter capable of expansion and limited decimation may be effective and efficient in the display processor as well.

The circuitry of FIGS. 2 and 7 may be replaced by a microprocessor or programmable logic which perform the filtering and decimation under the control of a program. A microprocessor may take more time to process the data stream, but is generally less expensive to implement. Implementing hardware to process the data stream is faster but generally more expensive. As the state of the art progresses, however, implementation of the circuitry described above may be faster via a microprocessor. All of these implementations are within the scope of the invention.

Figure 8:
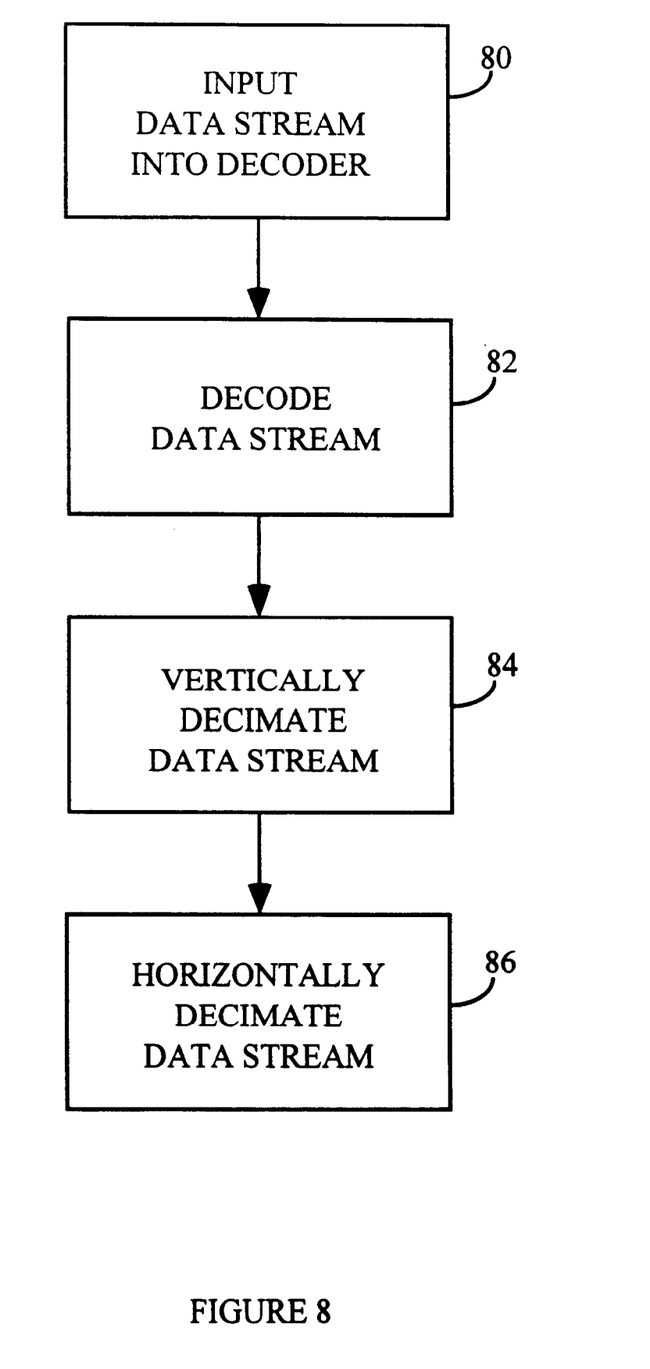
FIG. 8 is an exemplary flow chart of the data processing method according to the present invention.

FIG. 8 is a flow chart of the data processing method including decimation network 30. In step 80, a data stream of coded image representative data is input into a decoder for processing. The data stream may be, for example, MPEG-2 compatible data which was received by a tuner via a terrestrial broadcast. The data stream is decoded in step 82, and the decoded data stream is in the form of pixel blocks. In step 84, the data stream is vertically decimated. The decimation process operates on a single pixel block at a time. The pixel block may again be, for example, an MPEG-2 compatible pixel block. The pixel block is decimated by first alias filtering the vertical input line pixels values to be decimated into a single pixel value. Then, the filtered pixel values are weighted, and finally the weighted pixel values are summed into a single pixel value. Each decimated output pixel value is a combination of selected input pixel values from their respective input pixel block alone. An efficient decimation factor is 8 input pixels to 3 output pixels when the pixel blocks are MPEG compatible macroblocks, because a macroblock is generally 16 by 16 pixels for luminance data. However, other decimation rates may be used as described above, or as is suggested by the input data. Step 86 completes the decimation of the pixel block by decimating the block horizontally to provide a reduced resolution pixel block which may be combined with other reduced resolution pixel blocks, formatted as is known and displayed as a foreground image in a PIP, POP or PIG display.

What is claimed is:
1. A block based video processor comprising:

a source of spatial domain sampled video signal;

blocking circuitry responsive to said sampled video signal for forming N×M blocks of pixel values representing said sampled video signal, where N and M are integers less than 17;

subsampling circuitry responsive to blocks of pixel values for providing a lesser number of pixel values for respective blocks; wherein each one of said pixel values of said lesser number is derived solely from its associated input block.

2. The processor of claim 1, further comprising:

a memory between said decoder and said subsampling circuitry for storing a pixel block to be subsampled.

3. The processor of claim 1, further comprising:

a frame memory coupled to said decoder; wherein said decoder is MPEG compatible and said blocks of pixel data are macroblocks.

4. The processor of claim 1, wherein:

said subsampling circuitry comprises a macroblock memory, an alias reduction filter and a pixel subsampler.

5. The processor of claim 4, wherein:

said alias filter is one of a polyphase filter and a finite response filter.

6. The processor of claim 1, wherein:

said subsampling circuitry has a subsampling factor of 8 to 3.

7. A method for processing a data stream of coded image representative data, comprising the steps:

decoding said data steam to produce a decoded data stream representing pixel values in the spatial domain; and subsampling said data stream representing pixel values in the spatial domain to produce a reduced data stream; wherein said decoded data stream is comprised of pixel blocks of N×M pixel values, N and M integers less than 17;

said subsampling step produces pixel values lesser in number per block; and each one of said subsampled pixel values is derived solely from its associated input pixel block.

8. A method for processing a data stream of coded image representative data, comprising the steps:

decoding said data steam to produce a decoded data stream representing pixel values; and subsampling said data stream to produce a reduced data stream; wherein
said decoded data stream is comprised of pixel blocks;
said subsampling step produces pixel values lesser in number per block; and
each one of said subsampled pixel values is derived solely from its associated input pixel block;

formatting said reduced data stream to produce reduced resolution image data suitable for display; and combining said reduced resolution image data with image frame data representing a background image suitable for display.

9. The method of claim 8, wherein:

said data stream is MPEG compatible and said blocks of pixel data are macroblocks.

10. The method of claim 8, wherein:

said subsampling step includes the steps of alias reduction filtering and pixel subsampling.

11. The method of claim 8, wherein:

said subsampling step has a subsampling factor of 8 to 3.

12. In a digital video signal processing system, apparatus comprising:

- an input network for receiving a digital data stream containing coded image representative information;
- a decoder for decoding said digital data stream to provide blocks of pixel data;
- a buffer for receiving a block of pixel data;
- a subsampling circuitry for subsampling said buffered block of pixel data to produce reduced resolution image data; and
- a display processor for combining said reduced resolution image data with image frame data representing a background image; wherein
- each subsampled pixel value from said subsampling circuitry is derived solely from its associated input pixel block.

13. The system of claim 12, further comprising:

a memory for storing said blocks of pixel data and said reduced resolution image data.

14. The system of claim 12, wherein:

said subsampling circuitry vertically subsamples said data stream.

15. The system of claim 12, wherein:

said subsampling circuitry horizontally subsamples said data stream.

16. The system of claim 12, wherein:

said subsampling circuitry comprises an alias reduction filter and a subsampling circuitry.

17. The system of claim 12, wherein:

said decoder is MPEG compatible capable of decoding a high definition video signal, and includes a motion compensation network;

said memory is a frame memory; and said blocks of pixel data are macroblocks.

18. The system of claim 12, wherein:

said reduced resolution image data comprises a frame suitable for use with said background image for producing one of a picture-in-picture display, a picture-on-picture display, and a picture-in-graphics display.

* * * * *